(12) United States Patent
Bose et al.

(10) Patent No.: US 8,442,958 B2
(45) Date of Patent: May 14, 2013

(54) SERVER CHANGE MANAGEMENT

(75) Inventors: Patrick Glen Bose, San Francisco, CA (US); Ky Tong Vong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 11/692,736

(22) Filed: Mar. 28, 2007

(65) Prior Publication Data

US 2007/0299906 A1 Dec. 27, 2007

Related U.S. Application Data

(60) Provisional application No. 60/805,855, filed on Jun. 26, 2006.

(51) Int. Cl.
*G06F 7/00* (2006.01)
*G06F 17/00* (2006.01)

(52) U.S. Cl.
USPC ........... 707/694; 707/703; 707/704; 711/161; 711/162

(58) Field of Classification Search ................... None
See application file for complete search history.

(56) References Cited

U.S. PATENT DOCUMENTS

| | | | |
|---|---|---|---|
| 6,308,315 B1 | 10/2001 | Dice et al. | |
| 6,421,711 B1 * | 7/2002 | Blumenau et al. | 709/213 |
| 6,499,063 B1 * | 12/2002 | Chessell et al. | 719/315 |
| 6,631,395 B1 * | 10/2003 | Chessell | 718/101 |
| 6,801,949 B1 | 10/2004 | Bruck et al. | |
| 7,069,296 B2 * | 6/2006 | Moller et al. | 709/203 |
| 7,076,801 B2 * | 7/2006 | Gong et al. | 726/11 |
| 7,111,300 B1 * | 9/2006 | Salas et al. | 718/105 |
| 7,213,065 B2 | 5/2007 | Watt | |
| 7,356,679 B1 | 4/2008 | Le et al. | |
| 7,366,742 B1 | 4/2008 | Umbehocker et al. | |
| 7,379,990 B2 * | 5/2008 | Tsao | 709/223 |
| 7,546,354 B1 * | 6/2009 | Fan et al. | 709/219 |
| 7,706,303 B2 | 4/2010 | Bose et al. | |
| 7,747,816 B1 * | 6/2010 | Nourmohamadian et al. | 711/111 |
| 2002/0001307 A1 * | 1/2002 | Nguyen et al. | 370/386 |
| 2002/0165961 A1 * | 11/2002 | Everdell et al. | 709/225 |
| 2002/0188870 A1 * | 12/2002 | Gong et al. | 713/201 |
| 2003/0005028 A1 * | 1/2003 | Dritschler et al. | 709/104 |

(Continued)

OTHER PUBLICATIONS

"U.S. Appl. No. 11/743,537, Preliminary Amendment filed Jun. 17, 2008", 7 pgs.

(Continued)

*Primary Examiner* — Angelica Ruiz
(74) *Attorney, Agent, or Firm* — Schwegman, Lundberg & Woessner, P.A.

(57) ABSTRACT

In one embodiment, methods and systems for change management are described. A server system may include a physical server and a virtual server capable of being deployed on the physical server. A server change group may include one or more server change objects. Each server change object may represent a server change to be made to at least one of the physical server or the virtual server. A change manager may receive a request for a change to the server system, select transitioning change objects from among the server change objects to transition the server system from a current state to an expected state after implementation of the change, and execute the transitioning change objects to implement the change to the server system.

18 Claims, 14 Drawing Sheets

U.S. PATENT DOCUMENTS

| | | |
|---|---|---|
| 2003/0018927 A1 | 1/2003 | Gadir et al. |
| 2003/0217131 A1 | 11/2003 | Leslie et al. |
| 2004/0054725 A1* | 3/2004 | Moller et al. ................. 709/204 |
| 2004/0141005 A1* | 7/2004 | Banatwala et al. ........... 345/751 |
| 2004/0236633 A1* | 11/2004 | Knauerhase et al. ........... 705/26 |
| 2005/0120160 A1 | 6/2005 | Plouffe et al. |
| 2005/0262505 A1* | 11/2005 | Esfahany et al. ................. 718/1 |
| 2006/0041660 A1* | 2/2006 | Bishop et al. ................. 709/224 |
| 2006/0107087 A1 | 5/2006 | Sieroka et al. |
| 2006/0114917 A1 | 6/2006 | Raisch |
| 2006/0143617 A1* | 6/2006 | Knauerhase et al. ......... 718/104 |
| 2006/0294516 A1 | 12/2006 | Winner et al. |
| 2007/0027973 A1 | 2/2007 | Stein et al. |
| 2007/0067435 A1* | 3/2007 | Landis et al. ................. 709/224 |
| 2007/0094367 A1* | 4/2007 | Esfahany et al. ............. 709/223 |
| 2007/0234334 A1 | 10/2007 | Araujo, Jr. et al. |
| 2007/0234337 A1 | 10/2007 | Suzuki et al. |
| 2007/0250608 A1 | 10/2007 | Watt |
| 2007/0258388 A1 | 11/2007 | Bose |
| 2007/0283015 A1 | 12/2007 | Jackson et al. |
| 2007/0297428 A1 | 12/2007 | Bose et al. |
| 2009/0282404 A1 | 11/2009 | Khandekar et al. |
| 2010/0228840 A1 | 9/2010 | Bose et al. |

OTHER PUBLICATIONS

"U.S. Appl. No. 12/754,489, Final Office Action mailed Nov. 20, 2012", 16 pgs.

* cited by examiner

US 8,442,958 B2

SERVER CHANGE MANAGEMENT

PRIORITY CLAIM

This application claims the priority benefit of U.S. Provisional Application No. 60/805,855, filed 26 Jun. 2006, which is incorporated herein by reference.

TECHNICAL FIELD

This application relates to data processing systems and networking. More particularly, the present disclosure relates to methods and systems for server change management.

BACKGROUND

Server changes made to physical and/or virtual servers may be implemented through several different change mechanisms. The server changes may be implemented using such as with hard-coded programming in which the available server changes are predefined. Other change mechanisms may include using a workflow mechanism whereby a user can group operations together into a server change. Commands may be used with the workflow mechanism to enable flexibility. An example workflow can be saved and used as a template to enable some variable substitution and reuse with future server changes. Another change mechanism is the use of macros that can be user initiated or triggered based on events. Modifications to the macros may be made by saving the server change as a new macro.

BRIEF DESCRIPTION OF DRAWINGS

The particular embodiments of the invention are illustrated by way of example, and not limitation, in the figures of the accompanying drawings, in which like reference numerals indicate the same or similar features unless otherwise indicated.

In the drawings.

OVERVIEW

Method and systems for server change management are described. A server system may include a physical server and a virtual server capable of being deployed on the physical server. A server change group may include one or more server change objects. Each server change object may represent a change to be made to at least one of the physical server or the virtual server. A change manager may receive a request for the change to the server system, select transitioning change objects from among the server change objects to transition the server system from a current state to an expected state after implementation of the change, and execute the transitioning change objects to implement the change to the server system.

DESCRIPTION OF EXAMPLE EMBODIMENTS

In the following description, for purposes of explanation, numerous specific details are set forth in order to provide a thorough understanding of example embodiments. It will be evident, however, to one skilled in the art that the present invention may be practiced without these specific details FIG. 1 generally illustrates a virtual server system 10 (herein referred to by way of example as "VSS" with associated hardware on which one or more virtual servers are deployed. The virtual server system 10 allows server personalities to be assigned to generic static servers over a server fabric switch, however server personalities may also be assigned to other servers. The virtual server system 10 may be a VFRAME system available from Cisco Systems Inc. or any other virtual server system.

In an example embodiment, as the server personality is disembodied or separated from the physical structure, it may be possible to provision virtual servers on-demand out of industry standard components to enable differing configurations of virtual servers without reconfiguring the server. Each virtual server deployed on a physical server defines a state of a physical server. This may include the logical definitions and configuration information stored in and used by a VSS director (described by way of example in more detail below) to program a server fabric, an OS and applications of the virtual server. The state may be stored on a logical unit on a Storage Area Network 30, as described in more detail below. Thus, in FIG. 1, the example physical servers 22.1-22.n are the physical devices on which one or more virtual servers run. These physical servers include a CPU, memory, IO devices, and the like.

Figure 1:
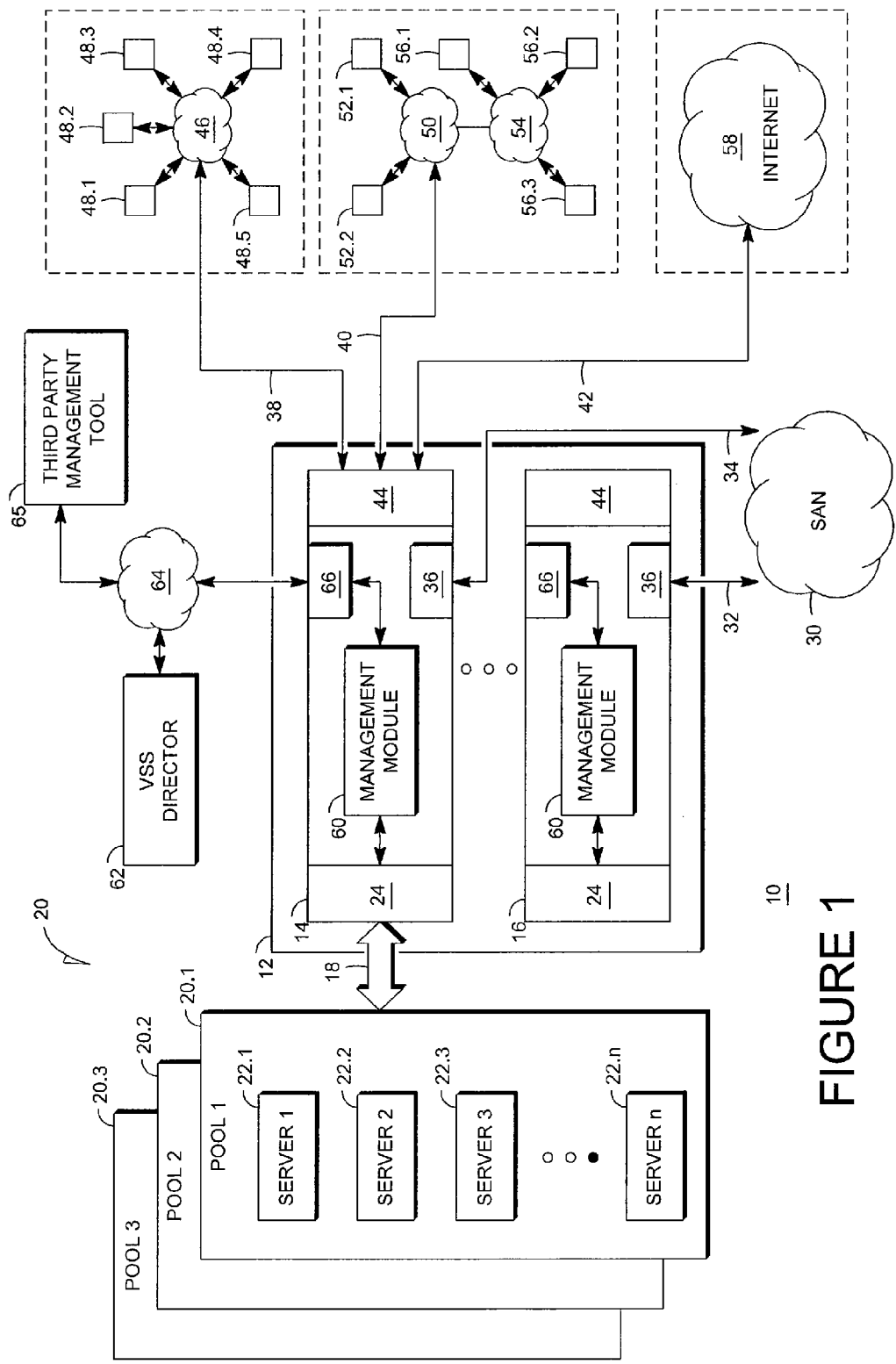
FIG. 1 is a block diagram of example architecture of a virtual server system.

The system 10 is shown, by way of example, to include a switch group 12 including one or more switches 14, 16. The switch group 12 is connected, for example, via an InfiniBand link 18 (e.g., a switched fabric communications link) to one or more server pools 20. Each server pool 20.1-20.3 is shown to include a plurality of physical servers 22.1-22.*n* linked via one or more InfiniBand links 18 to the switch group 12. By way of example, three physical server pools 20.1-20.3 (on which the virtual servers are deployed) are shown in FIG. 1 but any number of server pools may be provided. Each server pool may have a different number of servers.

When the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an InfiniBand network, processing nodes and I/O nodes are connected to the fabric by Host Channel Adapters (HCAs) and Target Channel Adapters (TCAs). Other links may be provided in addition to instead of, the InfiniBand link 18.

Figure 2:
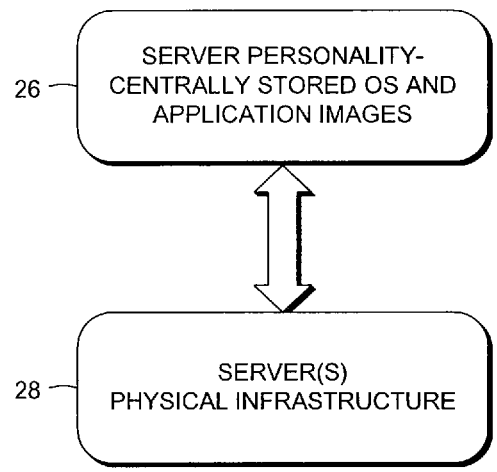
FIG. 2 is a block diagram showing separation of the physical infrastructure from the server personality of a server of the system of FIG. 1.

FIG. 2 shows the personality of each server 22.1-22.*n* disembodied or separated from the physical servers or infrastructure (see blocks 26 and 28 in FIG. 2). The server personality may describe the configuration of the virtual server. For example, the personality of the servers 22.1-22.*n* (e.g., the operating system (OS), application image(s), or the like may be stored remotely from the physical server infrastructure on a Storage Area Network (SAN) 30 (see FIG. 1).

In this example embodiment, the physical server infrastructure may be stateless computational resources with CPUs and memory. For example, as shown in FIG. 1, SAN 30 (including one or more databases) may be provided to operate in conjunction with the physical servers 22.1-22.*n*. It will be appreciated that the SAN 30 may be a distributed data facility dispersed geographically. In an example embodiment, the SAN 30 may be connected to the example switches 14, 16 via fibre channel connections 32, 34. Accordingly, each switch 14, 16 may include a fibre channel gateway 36. In other embodiments, the switches 14, 16 may communicate with the SAN 30 via other channels in addition to, or instead of, the fibre channel gateway 36. The personalities or state of the virtual servers may be stored in a local database or on the SAN 30.

The switch 14 communicates with a plurality of different networks (Local Area Networks, Wide Area Networks, or the like) via communication links 38, 40, 42. For example, the communication links 38, 40, 42 may be Ethernet connections and, each switch 14, 16 may include one or more Ethernet gateways 44. In the example system 10, the communication link 38 is shown to connect to a network 46 interconnecting a plurality of hosts 48.1-48.5. The hosts 48.1-48.5 may form part of another data network, or be any other network host.

The switch 14 also communicates via the communication link 40 to a network 50 which may, for example, be an enterprise network. The network 50 communicates with desktop computers 52.1-52.2 and a subnet 54 which, in turn, is connected to desktop computers 56.1-56.3. Further, the switch 14 connects via the communication link 42 to a network such as the Internet 58. The aforementioned networks are merely example networks and different configurations, and different numbers of networks and subnets may be provided that connect a wide range of network devices.

The system 10 may allow virtualization of servers deployed on physical servers to be managed by a management module 60. The management module 60 may be provided at the switch 14 or in other components. The management module 60 communicates with a VSS director 62 that controls the provisioning of the server pools 20.1-20.3.

In an example embodiment, the VSS director 62 communicates via a network 64 with the management module 60. The system 10 also includes a third party management module 65 that communicates with the VSS director 62 and/or with the management module 60 to manage the provisioning of virtual servers. In an example embodiment, the network 64 is an Ethernet network and, accordingly, the switch 14 may thus include one or more Ethernet ports 66. However, the various communication links linking the various components/devices in the system 10 are not restricted to InfiniBand connections, Ethernet connections, or the like. Any communication means may be provided to interconnect the various components.

Figure 3:
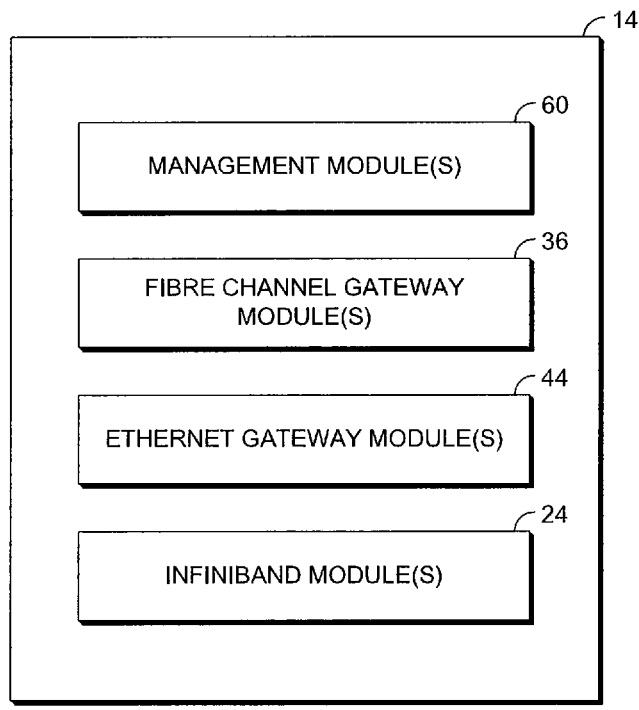
FIG. 3 is a block diagram of an example switch deployed in the system.

FIG. 3 shows example modules of the switch 14. The switch 14 may include one or more management modules 60, one or more fibre channel gateway modules 36, one or more Ethernet gateway modules 44, and one or more InfiniBand modules 24. The modules 60, 36, 44, and 24 may include various electronic components to effect communication using the relevant protocols. In an example embodiment, the VSS director 62 of the system 10 allows software partners to program the switches 14, 16 with policies necessary to implement virtual servers on demand. For example, the third party management tool 65 may be used to accomplish this.

Figure 4:
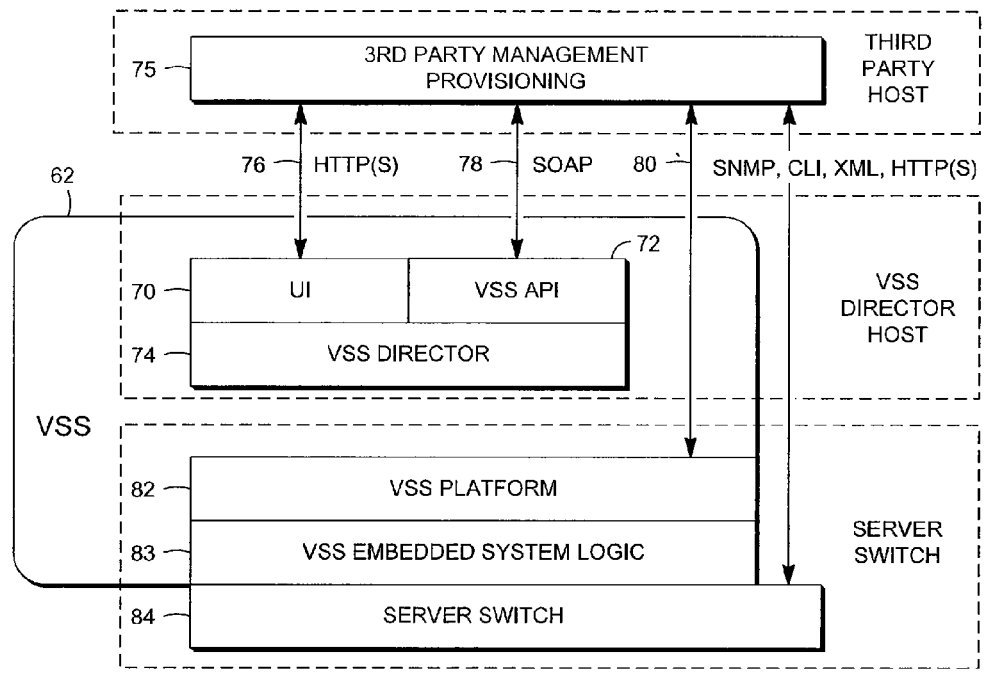
FIG. 4 is a block diagram of example software architecture of a management module communicating with a third party management tool.

As shown by way of example in FIG. 4, the VSS director 62 (which may reside on a separate server) may logically include a user interface module 70, a VSS director Application Program Interface (API) 72 and a VSS director platform 74. The VSS director 62 may communicate with a third party management tool application 75 (e.g., as may operate on the third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 may also communicate via link 80 to a VSS platform 82. The server switch 14 also may include embedded system logic 83 provided at a switch 84 (e.g., a switch 14, 16).

Figure 5:
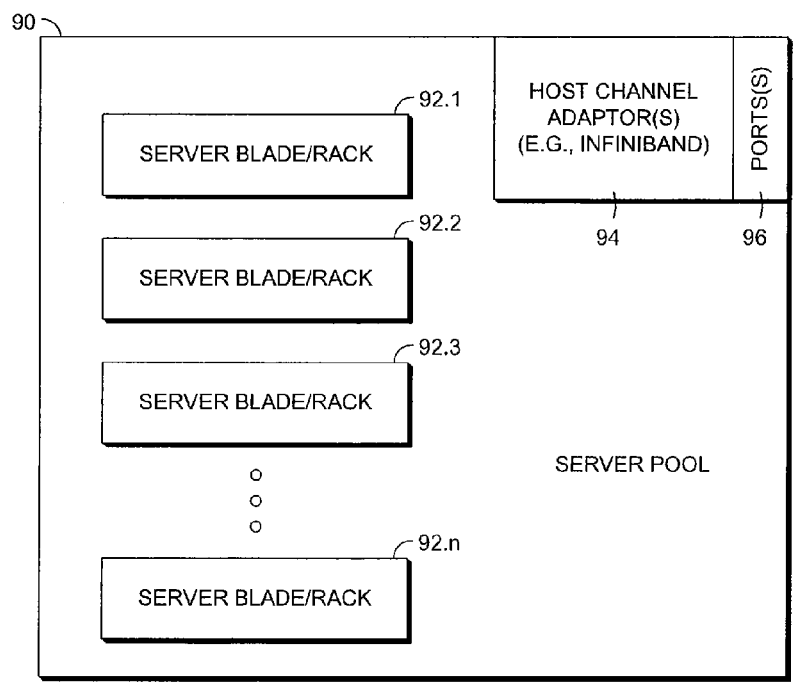
FIG. 5 is a block diagram of an example physical server pool of the system of FIG. 1.

FIG. 5 shows an example physical server pool 90. The server pool 90 is shown to include a plurality of physical servers or server blades 92.1-92.*n*. Each of the servers 92.1-92.*n* may host one or more virtual servers. The servers 92.1-92.*n* may correspond to the servers 22.1-22.*n* in FIG. 1. In an example embodiment, in order to communicate via the communication link 18, each server pool 90 includes one or more host channel adapters (HCA) 94 (e.g., one or two HCAs per physical server) when deployed in an InfiniBand environment. However, other adapters and configurations may be used in different environments. Further, one or more ports 96 may be provided for communication via further communication protocols or channels. As mentioned above, the servers 92.1-92.*n* are physical servers. The virtual servers hosted on the physical servers may be defined by network configuration and/or logical definitions stored in a database of the VSS director 62 and by a server state which is stored on networked storage.

Figure 6:
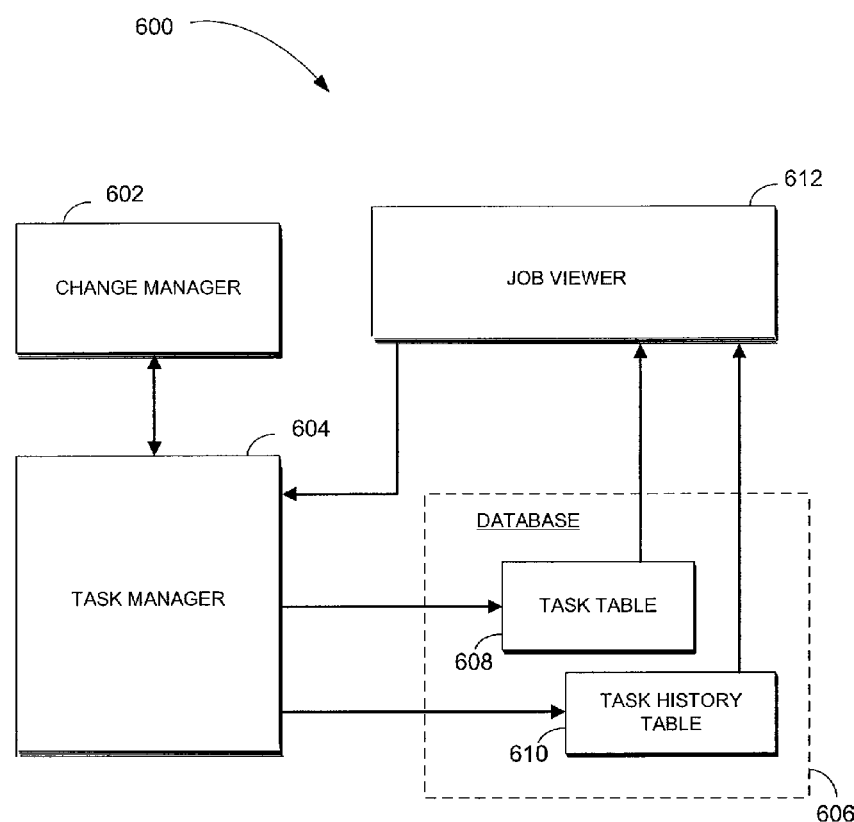
FIG. 6 is a block diagram of an example system for server change management.

FIG. 6 shows a system 600 for change management according to an example embodiment. The system 600 is described herein as being deployed on the virtual server system 10 (see FIG. 1), however the system 600 may be deployed in other architectures including other virtual server systems and non-virtual server systems such as managed systems.

A change manager 602 of the system 600 may be used to manage the execution of a change to the virtual server system 10 in which the system 600 is deployed. For example, the change manager 602 may receive a request for a change to the virtual server system 10, select transitioning change objects from among the server change objects to transition the virtual server system 10 from a current state to an expected state after implementation of the change, and to execute the transitioning change objects to implement the change to the virtual server system 10.

The transitioning change objects may be a subset of the server change objects based on a current state of the virtual server system 10. The subset may reflect the change objects to be used for the change while excluding change objects from the server change objects that are unneeded to implement the change. For example, one or more of the server change objects may not be needed to run in order to provision a new virtual server within the virtual server system 10 depending on the current state of a physical server of the virtual server system 10.

In an example embodiment, a server change object may encapsulate a change. The change manager 602 may obtain a state of the change from the server change object. The change manager 602 may receive one or more server change objects directly from the server system and/or through a task manager 604.

The change manager 602 may provide an execution environment for a change. For example, a change executed by the change manager 602 may include assigning a physical server to a virtual server or turning on the power to a physical server. The change manager 602 may also perform other changes to the state of the virtual server system 10.

A task manager 604 may receive task objects from a provisioning director (e.g., the VSS director 62 of FIG. 1) and run one or more tasks such as a change task (e.g., a task with change and change manager arguments). For example, the task manager 604 may receive one or more transitioning change objects from the change manager 602, optionally schedule execution of the transitioning change objects, and implement the change associated with the transitioning change objects to the virtual server system 10 as a change task through the change manager 602. A change task may optionally be a scheduled job of a change to the virtual server system 10.

In an example embodiment, the task manager 604 may include one or more job queues that may enable tasks to be run simultaneously. For example, a user may specify that the task manager 604 add tasks into a job queue and the task manager 604 may determine a time (e.g., a best time) to run the task or run the task immediately.

In an example embodiment, a change task may implement a change listener object. The change listener object may be configured to provide messages regarding execution of the change to an associated server change object (e.g., an associated transitioning object). The change task may optionally take the message received (e.g., as a change listener object to report back information on a server change) and add the messages to a task table 608 and a task history table 610 of a database 606. The task manager 604 may also write to the task table 608 and the task history table 610.

The database 606 may include one or more tables including the task table 608 and the task history table 610. However, other tables in the database 606 which may (or may not) be modified by the task manager 604 and/or the change manager 602 may also be provided.

The task table 608 may include information regarding tasks such as a nature of the task, when the task started, a running state of the task, an estimated time for completion of the task, current operation objects that are affected by the task, and the like. However, other information may also be provided.

The task history table 610 may include entries with timestamps, a reference to an associated task, and a text string. As each task runs, the tasks may update the task history table 610 with, for example, runtime information.

A job viewer 612 may access the database 606 to obtain information from the task table 608 and the task history table 610 to provide information to a user regarding system status such as existing tasks and a status of the existing tasks. In an example embodiment, the information may be messages (e.g., for the reporting of errors). However other types of messages may also be used. The job viewer 612 may optionally detail the status of a current operation such as a change to the server system.

A user may optionally interact with the system 600 through the job viewer 612. The user may select a job to get a history and a current status of a task. The user may also de-queue or cancel a task from the job viewer 612 by having the job viewer 612 communicate with the task manager 604.

Figure 7:
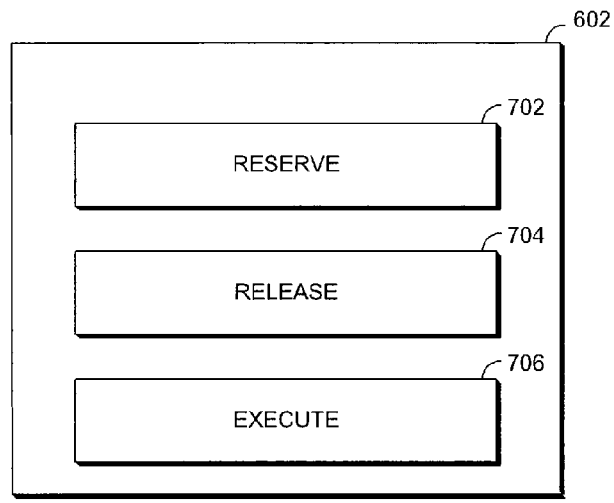
FIG. 7 is a block diagram of an example change manager.

FIG. 7 shows an example embodiment of a change manager 602 (see FIG. 6). The change manager 602 may include a reserve process 702, a release process 704, and an execute process 706. The reserve process 702 readies the virtual server system 10 (see FIG. 6) for the execute process 706, the release process 704 may unlock a resource (e.g., a server object) of the virtual server system 10, and the execute process 706 may execute an action on the resource of the virtual server system 10. For example, a resource may include a virtual server, a physical server, a location on a SAN, or the like.

In an example embodiment, the reserve process 702 may be performed to lock (or pre-lock) one or more resources of the virtual server system 10 (see FIG. 1), check the conditions that are required to execute a change to the virtual server system 10, update a state of a resource of the virtual server system 10 (e.g., to prevent another change from modifying the resource and/or to enable another process to determine a current operation of the resource), and the like.

A resource may be unlocked by the release process 704 when a job is cancelled prior to completing the execute process 706 such that additional processes may be run on the resource. For example, the release process 704 may restore the resource to its status prior to the reserve process 702 being run on the resource.

When the change task is executed, the change task may internally call the execute process 706 by passing a server change object contained by the change task. The execute process 706 may then run the server change of the server change object. In an example embodiment, after the server change is complete, the resources of the virtual server system 10 that were previously locked may be automatically unlocked.

Figure 8:
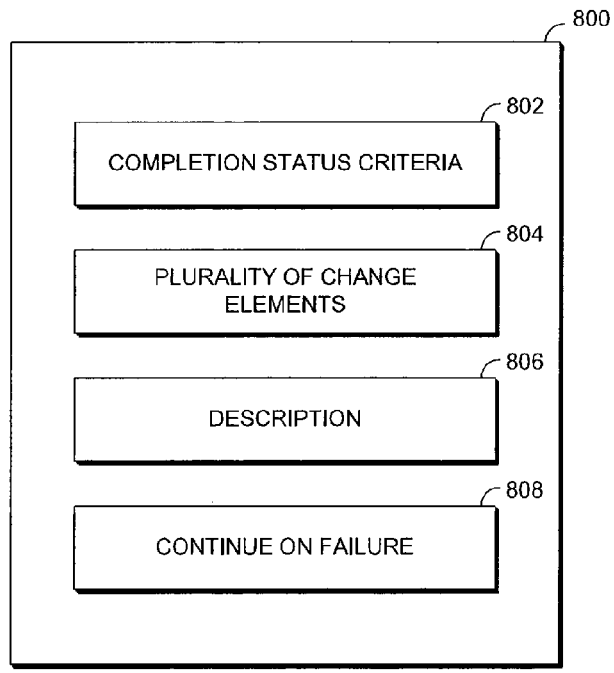
FIG. 8 is a block diagram of an example server change group.

FIG. 8 shows an example embodiment of a server change group 800. The server change group 800 may be a requested change to the virtual server system 10 that may include one or more server change objects. Every server change object included within the server change group 800 may not need be implemented (e.g., by the change manager 602) to effectuate a change depending on a current state of to the virtual server system 10 (see FIG. 1).

The use of the server change group 800 when suitably deployed may enable the system 600 to implement a more complex change to the virtual server system 10 that includes a number of underlying changes. For example, provisioning a virtual server on the virtual server system 10 (see FIG. 1) may include a plurality of server changes to the virtual server system 10 that may be implemented by a single server change group 800 including a number of server change objects.

By way of example, the server change group 800 is described as being capable of effectuating a change in state to the virtual server system 10 (see FIG. 1). However, the server change group 800 may also effectuate changes to other server systems.

To effectuate changes to the virtual server system 10, the server change group 800 may include a completion status criterion 802, a plurality of change elements 804 (e.g., change objects and nested change groups), a description 806, and a continue-on-failure state 808.

The completion status criterion 802 may indicate a check against the states of completed changes associated with the plurality of change elements 804. In an example embodiment, if the completion status criterion 802 is not met, than the system 600 may reflect that the processing of a particular server change group 800 has failed.

For example, the completion status criterion 802 may be as follows:
- a completion status criterion 802 of FINISH ALL may provide that if any element of the plurality of change elements 804 does not return a state of FINISHED COMPLETE or FINISHED PASSED then the server change group 800 has failed;
- a completion status criterion 802 of FINISH SOME may provide that if a certain number or percentage of elements of the plurality of change elements 804 (e.g., a minimum of one change element) do not return a state of FINISHED COMPLETE or FINISHED PASSED then the server change group 800 has failed; and/or
- a completion status criterion 802 of FINISH NONE may not fail the server change group 800 regardless of the number or percentage of the plurality of change elements 804 that do not have a FINISHED COMPLETE or a FINISHED PASSED.

The description 806 of the server change group 800 may provide information regarding the server change group 800. For example, the description 806 may identify the server change group 800, however, other types of descriptions may also be used.

The continue-on-failure state 808 may indicate whether the server change group 800 may continue to be executed when a requested server change associated with the plurality of change elements 804 has failed. In an example embodiment, the continue-on-failure state 808 may be set to enable (or cease) further processing of the server change group 800 when an element of plurality of change elements 804 has failed and/or the completion status criterion 802 has not been met.

Figure 9:
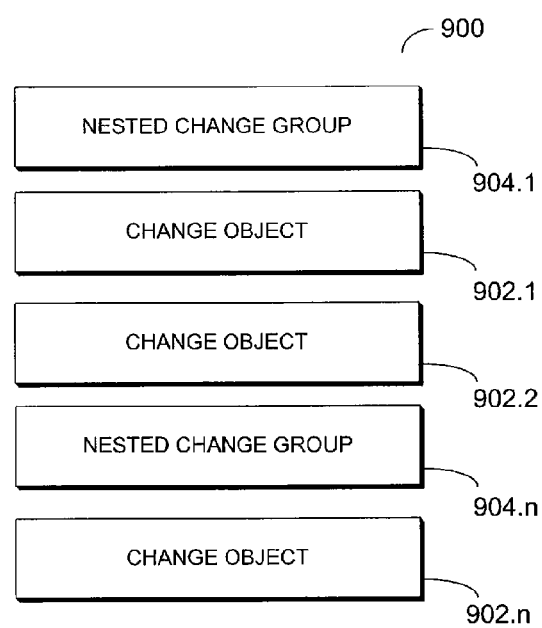
FIG. 9 is a block diagram of an example plurality of change elements of the server change group of FIG. 8.

FIG. 9 shows a plurality of change elements 900 according to an example embodiment. The plurality of change elements 900 may be an example of the plurality of change elements 804 (see FIG. 8). The plurality of change elements 900 may include a number of change objects 902.1-902.n and an optional number of nested change groups 904.1-904.n. An example embodiment of the change object 902 is described in greater detail below.

The nested change group 904 may include a server change group 800 that includes the completion status criterion 802, the plurality of change elements 804, the description 806 and the continue-on-failure state 808 (see FIG. 8). The plurality of change elements 804 of the nested change group 904 may optionally include one or more additional nested change groups 904 to enable multiple nesting levels within the server change group 800.

Figure 10:
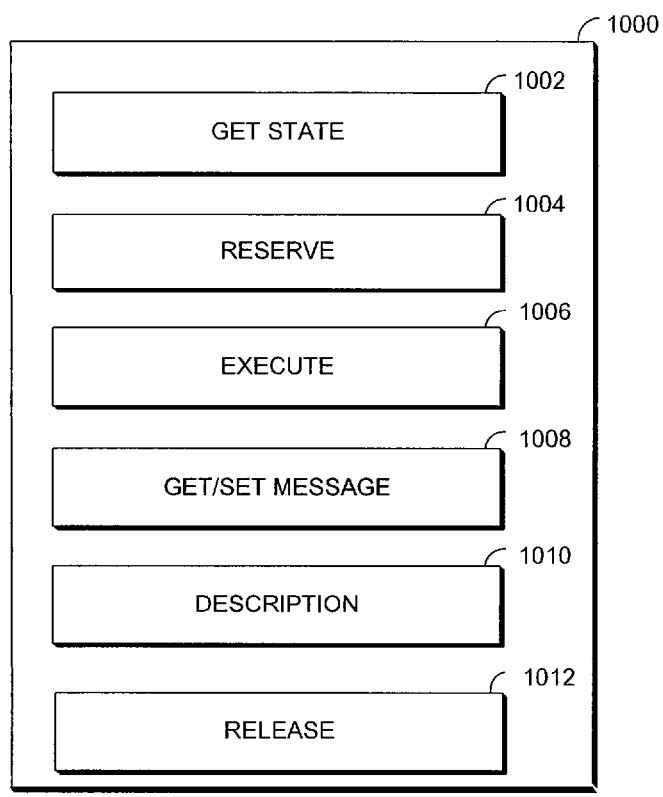
FIG. 10 is a block diagram of an example server change object.

FIG. 10 shows a server change object 1000 according to an example embodiment. A particular server change object 1000 may not be selected as a transitioning change object to effectuate a change depending on a current state of to the virtual server system 10 (see FIG. 1). In an example embodiment, the number of server change objects 902.1-902.n (see FIG. 9) may each include the functionality of the server change object 1000.

The server change object 1000 may provide an interface for the change manager 602 to run a server change and may include a get state process 1002, a reserve process 1004, an execute process 1006, a get/set message process 1008, a description 1010, and a release process 1012.

The get state process 1002 may obtain a current state of a server change to a server system (e.g., the virtual server system 10 of FIG. 1). The current state may be one of a plurality of states including, but not limited to, a NOT STARTED state, a RUNNING state, a FINISHED COMPLETE state, a FINISHED PASSED state, a FINISHED FAILED state, and a CANCEL FAILED state. These states may, for example, be defined as follows:
- The NOT STARTED state may indicate that a requested server change to a the virtual server system 10 has not yet been started;
- The RUNNING state may indicate a server change is currently running;
- The FINISHED COMPLETE state may indicate that there were no problems completing a server change and the associated operations worked fully with no errors or warnings;
- The FINISHED PASSED state may indicate that a server change finished but did not fail, as there was one or more issues (e.g., not all possibilities for implementing the change were available with the virtual server system 10) with completing the requested operations;
- The FINISHED FAILED state may indicate that a server change was completed unsuccessfully; and
- The CANCEL FAILED state may indicate that a server change was cancelled by the user or the virtual server system 10 before the change could finish.

The reserve process 1004 may ready the server system for the execute process 1006. For example, the reserve process 1004 may function like the reserve process 702 (see FIG. 7).

The execute process 1006 may run a server change. For example, the change manager 602 (see FIG. 6) may check the state of the requested server change after the execute process 1006 completes by performing the get state process 1002.

The get/set message process 1008 may be used by the change and the change manager 602 to convey messages such as during execution of a requested server change. In an example embodiment, the messages may be error messages, however other messages such as pass/fail messages may also be provided. Errors may include, but are not limited to, the unavailability of a resource (e.g., a server object) within a server system (e.g., the virtual server system 10), why an operation failed, or the like.

In an example embodiment, a listener object (an example of which is described in greater detail below) may be passed as a reference to the execute process 1006, the reserve process 1004, and the release process 1012 to receive messages regarding the execute process 1006, the reserve process 1004, and the release process 1012 respectively.

The description 1010 may describe a server change being implemented by the server change object 1000. For example, when the change manager 602 is to execute a server change object 1000, the change manager 602 may get the description 1010 associated with the server change object 1000, run the execute process 1006 on the server change object 1000, and run the get state process 1002 to obtain a state of the execution of the server change object 1000. The job viewer 612 (see FIG. 6) may then show the change objects 1000 that were executed, the description 1010 for each of the executed change objects 1000, and a message received from the get/set message process 1008.

An object may be unlocked by the release process 1012 when a job is cancelled prior to running the execute process 1006 such that additional processes may be run on the object. For example, the release process 1012 may restore an object of the virtual server system 10 to its status prior to the reserve process 1004 being run on the object.

Figure 11:
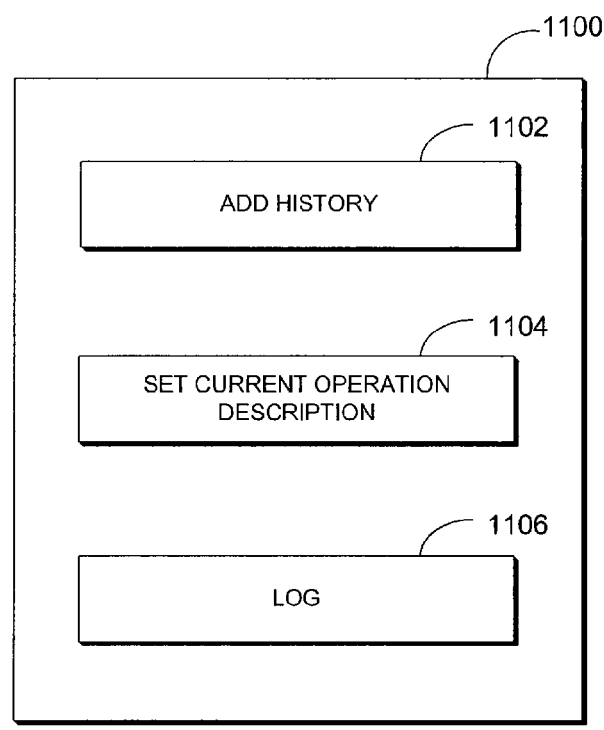
FIG. 11 is a block diagram of an example listener object.

FIG. 11 shows an example listener object 1100. In an example embodiment, a listener object 1100 may be passed as a reference to the execute process 1006, the reserve process 1004, and the release process 1012 to receive messages regarding the execute process 1006, the reserve process 1004, and the release process 1012 respectively (see FIG. 10).

The listener object 1100 may report back information on a server change to the system 600 (see FIG. 6). The listener object 1100 may include an add history process 1102, a set current operation description process 1104, and a log process 1106.

The add history process 1102 may store information regarding a task in the task history table 610 (see FIG. 6) and/or log the information received.

The change manager 602 (see FIG. 6) may obtain the description 1010 (see FIG. 10) of a running change and update the task table 608 with a current operation by calling the set current operation description process 1104 of the change listener object 1100.

In an example embodiment, both the change manager 602 and the server change object 1000 (see FIG. 10) may receive the listener object 1100 as an argument. During execution of the server change object 1000, messages may be sent to the change task using the add history process 1102 and/or the log process 1106 to indicate the progress, errors, completion, and/or other status related information to the server change and its execution.

The log process 1106 may store information in one or more logs. For example, the one or more logs may contain information regarding implementation of a server change that may be used for debugging purposes and the listener object 1100 may optionally correlate information received from a job into one or more logs.

In an example embodiment, the listener object 1100 may optionally be an argument for the execute processes 706, 1006, the reserve processes 702, 1004 and the release processes 704, 1012 (see FIGS. 7 and 10).

Figure 12:
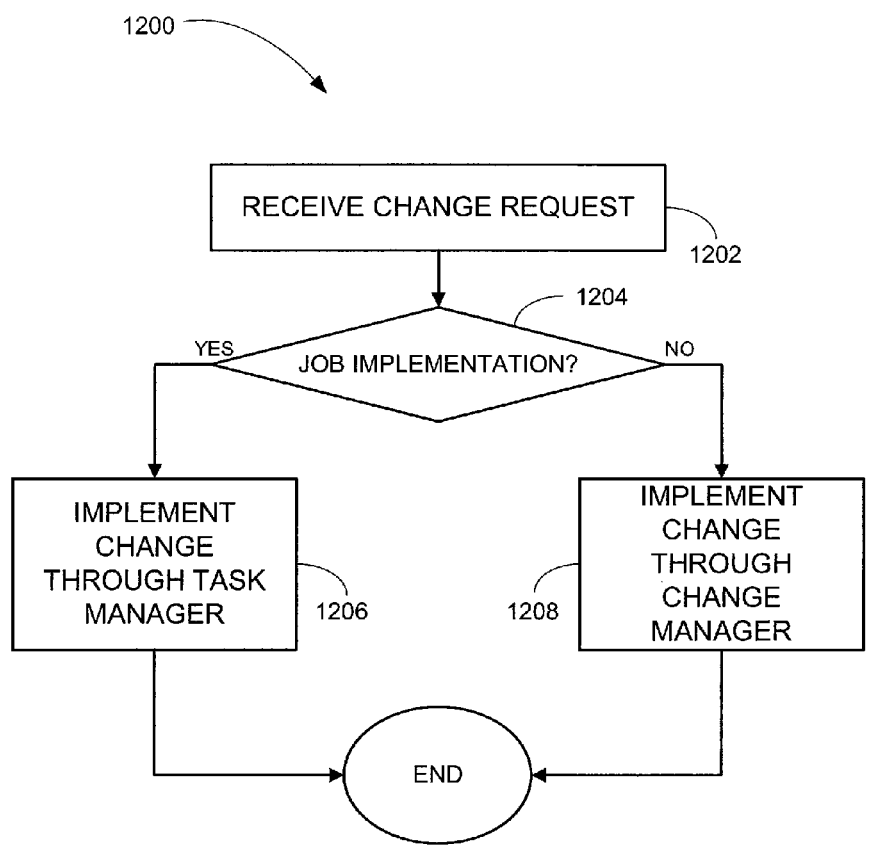
FIG. 12 is a flowchart illustrating a method for determining a manner in which a requested change is to be implemented within the system of FIG. 6 used in an example embodiment.

FIG. 12 shows a method 1200 for determining a manner in which a requested change is to be implemented within the system 600 (see FIG. 6) in accordance with an example embodiment. The determination to implement a requested change as a job through the task manager 604 may make more information regarding execution status of the requested change available for viewing through the job viewer 612 as opposed to implementing the request change directly through the change manager 602 where such information may not be available. In an example embodiment, the method 1200 may be performed by the VSS director 62 (see FIG. 1) and/or resources (e.g., the change manager 602 of FIG. 6) operating under the direction of the VSS director 62. However, other resources of the server systems may also be used.

A requested change (e.g., requested by a user of the system 600 of FIG. 6) to a state of the virtual server system 10 may be received at block 1202. Examples of changes may include, but are not limited to, provisioning one or more servers, assigning a virtual server to a physical server, deploying of a virtual server image, disabling one or more virtual or physical servers, powering on or off a physical server, or the like.

At decision block 1204, a determination may be made (such as by the change manager 602 of FIG. 6) whether to implement the change as a job to obtain more information regarding the execution of the requested change. For example, the change may be implemented as a job when the requested change may later need to be debugged and/or when the requested change is complex. Complex changes may include a server change with more than a specified number of change elements 900 or a long running job. Other changes may also be implemented as jobs.

If a requested change is to be implemented as a job, the change may be implemented as a change task through the task manager 604 (see FIG. 6) at block 1206. The change task may be an object that implements a task interface and encapsulates references to the change and the change manager 602. The task manager 604 may execute the change task using the change manager 602 for execution and receive information regarding execution of the change objects from the change listener.

In an example embodiment, when task manager 604 runs a change task, change task may call the execute process 706 (see FIG. 7) of the change manager 602 to execute the change request. The change task may also implement the change listener interface and include a reference to itself in the call to the change manager 602. By calling the change manager 602 to execute the change using the change task as the listener object, information (e.g., status updates) regarding the task may be sent back to the task manager 604.

If a determination is made at decision block 1204 not to implement the change as a job, the requested change may be implemented through the change manager 602 at block 1208. For example, implementing a change through the change manager 602 at block 1208 may include performing the change directly through the change manager 602 without the use of task manager 604 thereby making additional information regarding the execution of the change unavailable. Upon completion of the operations at block 1206 or block 1208, the method 1200 may terminate.

In an example embodiment, running a task through the task manager 604 at block 1206 may provide information regarding the task to the database 606 so that the information regarding the change may be provided to a user in the job viewer 612 (see FIG. 6). However, running a task through change manager 602 at block 1208 may not provide information regarding the change to a user in the job viewer 612. Information regarding the change may be provided via log files during the operations at block 1206 and/or block 1208.

Figure 13:
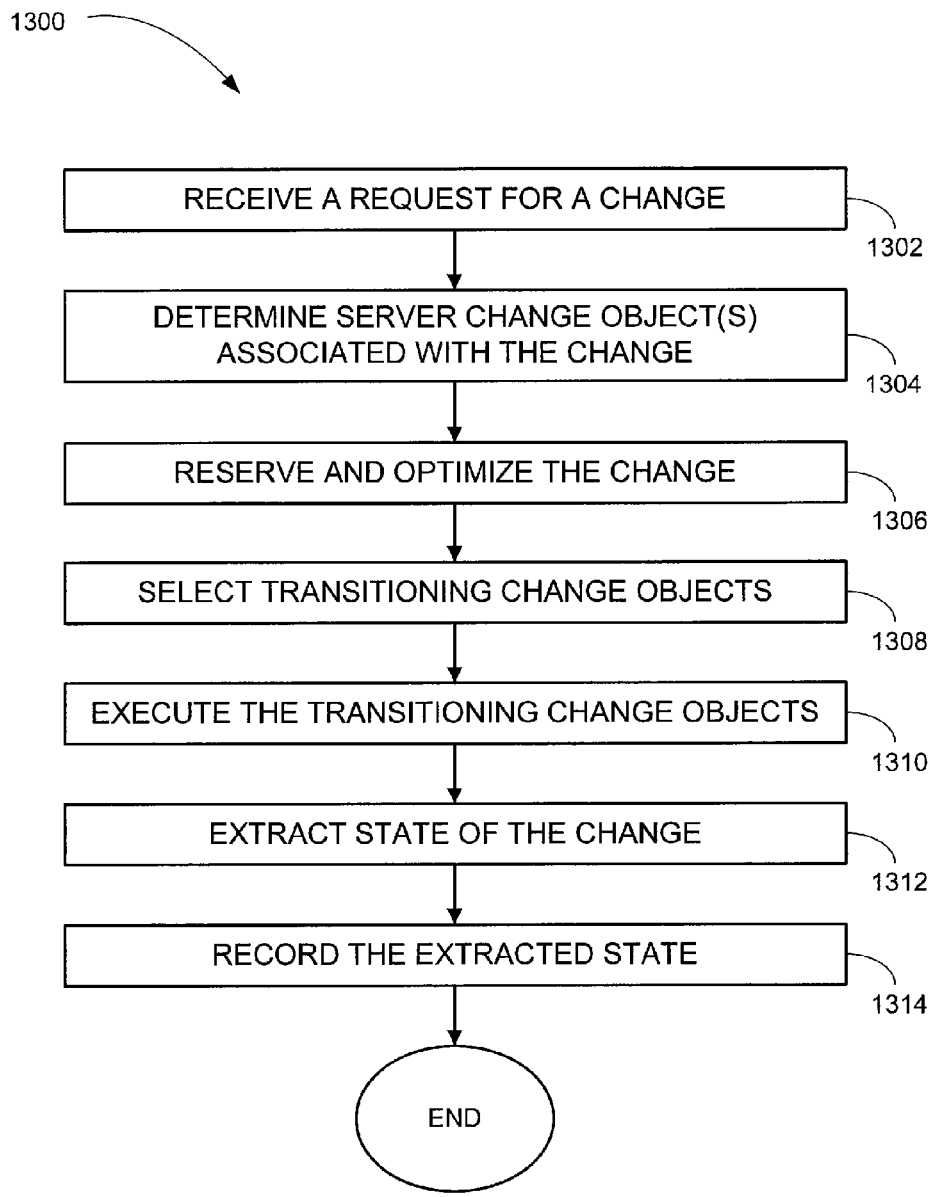
FIG. 13 is a flowchart illustrating a method for implementing a change used in an example embodiment.

FIG. 13 shows a method 1300 for implementing a change according to an example embodiment. In an example embodiment, the method 1300 may be performed at block 1206 and/or block 1208 (see FIG. 12). The method 1300 may optionally be implemented by the change manager 602 (see FIG. 6) and/or other objects and devices of a server system.

A request for a change to the virtual server system 10 may be received at block 1302.

One or more server change objects 1000 associated with the change may be accessed at block 1304. For example, a change group 800 (see FIG. 8) associated with a change to the virtual server system 10 may be accessed during the operations at block 1304.

The change may be reserved and optimized within the server system at block 1306. For example, the change may be reserved by running the reserve process 1004 (see FIG. 10) and may be optimized by preparing the server change objects 1000 to be executed in parallel, however other optimization processes may also be utilized.

At block 1308, the transitioning change objects may be selected from among the server change objects 1000 for server transitioning. For example, of the virtual server system 10 may be queried to select a number of transitioning change objects from among the number of server change objects 1000 to transition the virtual server system 10 from the current state to an expected state after implementation of the change.

The transitioning change objects may be executed at block 1310. For example, the change may be executed by running the execute process 1006 (see FIG. 10). The transitioning change objects may optionally be synchronized prior to execution during the operations at block 1310, an example embodiment of which is described in greater detail below.

The state of the change (e.g., of the plurality of server changes) may be extracted at block 1312. For example, the state of the change may be extracted by running the get state process 1002 (see FIG. 10).

The extracted state may then be recorded at block 1314. The extracted state may be optionally stored by the add history process 1102 (see FIG. 11). Extract and recording the status of the change during the operations at block 1312 and block 1314 may enable a status of the change to be viewed through the task manager 604 (see FIG. 6).

Upon completion of the operations at block 1314, the method 1300 may terminate.

Figure 14:
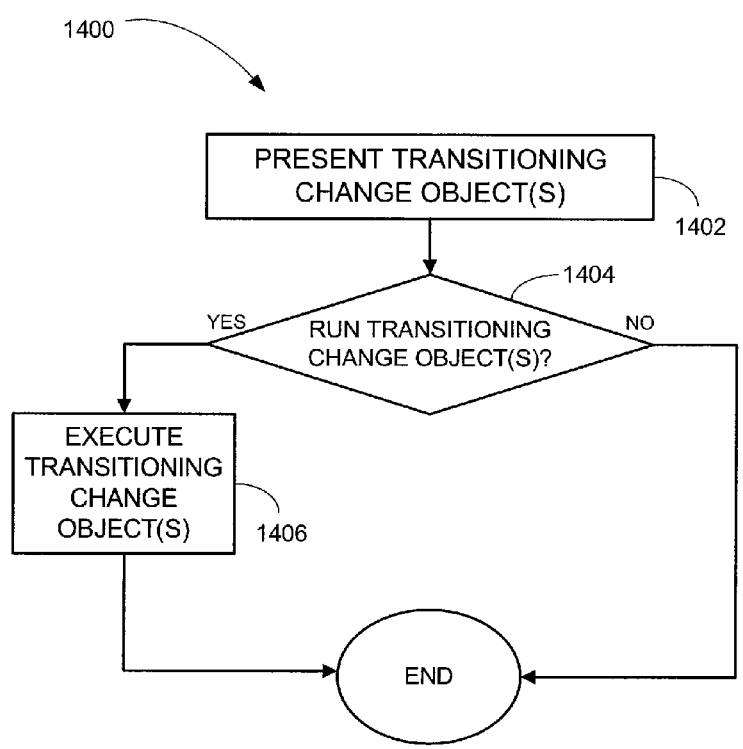
FIG. 14 is a flowchart illustrating a method for synchronizing and executing a change within a server system used in an example embodiment.

FIG. 14 shows a method 1400 for synchronizing and executing a change within a server system according to an example embodiment. In an example embodiment, the method 1400 may be performed at block 1306 (see FIG. 13).

The transitioning change objects may be presented at block 1402. For example, the transitioning change objects 902, 1000 may be presented to a user and/or the server system to seek a confirmation for execution of the transitioning change objects.

At decision block 1404, a determination may be made whether to run the transitioning change objects. If the determination is made to run the transitioning change objects, the transitioning change objects may be executed at block 1406. If the determination is made not to run the transitioning change objects at decision block 1404, or upon completion of the operations at block 1406, the method 1400 may terminate.

In an example embodiment, the determination at decision block 1404 may be made automatically by the method 1400 and/or manually by a user.

Figure 15:
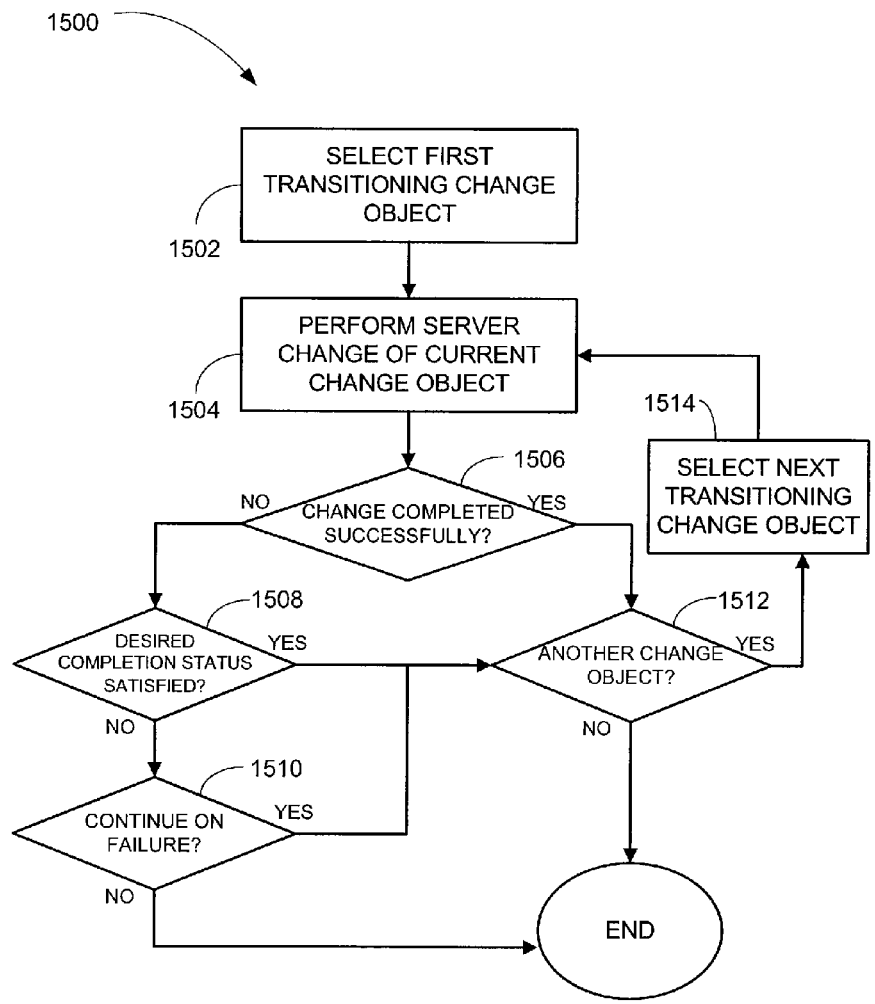
FIG. 15 is a flowchart illustrating a method for executing server change objects of a sever change group in an example embodiment.

FIG. 15 shows a method 1500 for executing the transitioning change objects according to an example embodiment. In an example embodiment, the method 1500 may be performed at block 1406 and/or implemented by the change manager 602 (see FIG. 6) and/or other objects and devices of a server system.

A first transitioning change object may be selected at block 1502. An example embodiment of selecting a server change object 902, 1000 from the plurality of change elements 900 as a transiting change object is described in greater detail below.

A server change of a transitioning change object 902 may be performed at block 1504. For example, the server change may be performed by running the execute process 1006 (see FIG. 10).

At decision block 1506, a determination may be made as to whether the server change of an executed change object was completed successfully. The determination as to whether the server change was completed successfully or not may optionally be based on a state obtained from the get state process 1002 (see FIG. 10).

If the server change was determined to be successfully completed at decision block 1506, the method 1500 may proceed to decision block 1512. However, if the server change was determined not to be successfully completed at decision block 1506, the method 1500 may proceed to decision block 1508 (e.g., to determine whether the completion criterion has been met).

At decision block 1508, a determination may be made as to whether the completion status criterion 802 (see FIG. 8) is satisfied. If the completion status criterion 802 is satisfied, the method 1500 may proceed to decision block 1512. If the completion status criterion 802 is not satisfied at decision block 1508, the method 1500 may proceed to decision block 1510.

A determination may be made at decision block 1510 as to whether the continue-on-failure state 808 (see FIG. 8) indicates that the system 600 (see FIG. 6) should cease processing the transitioning change objects. If the continue-on-failure state 808 indicates that the method 1500 should cease processing, then the method 1500 may terminate (e.g., halting execution of a remaining number of the transitioning change objects). If the continue-on-failure state 808 indicates that the method 1500 should not cease processing, the method 1500 may proceed to decision block 1512.

At decision block 1512, a determination may be made as to whether another transitioning change object is available (e.g., from the plurality of change elements 900). If another transitioning change object is available, an available transitioning change object may be selected at block 1514 and the method 1500 may return to block 1504. If another transitioning change object is not available at decision block 1512, the method 1500 may terminate.

Figure 16:
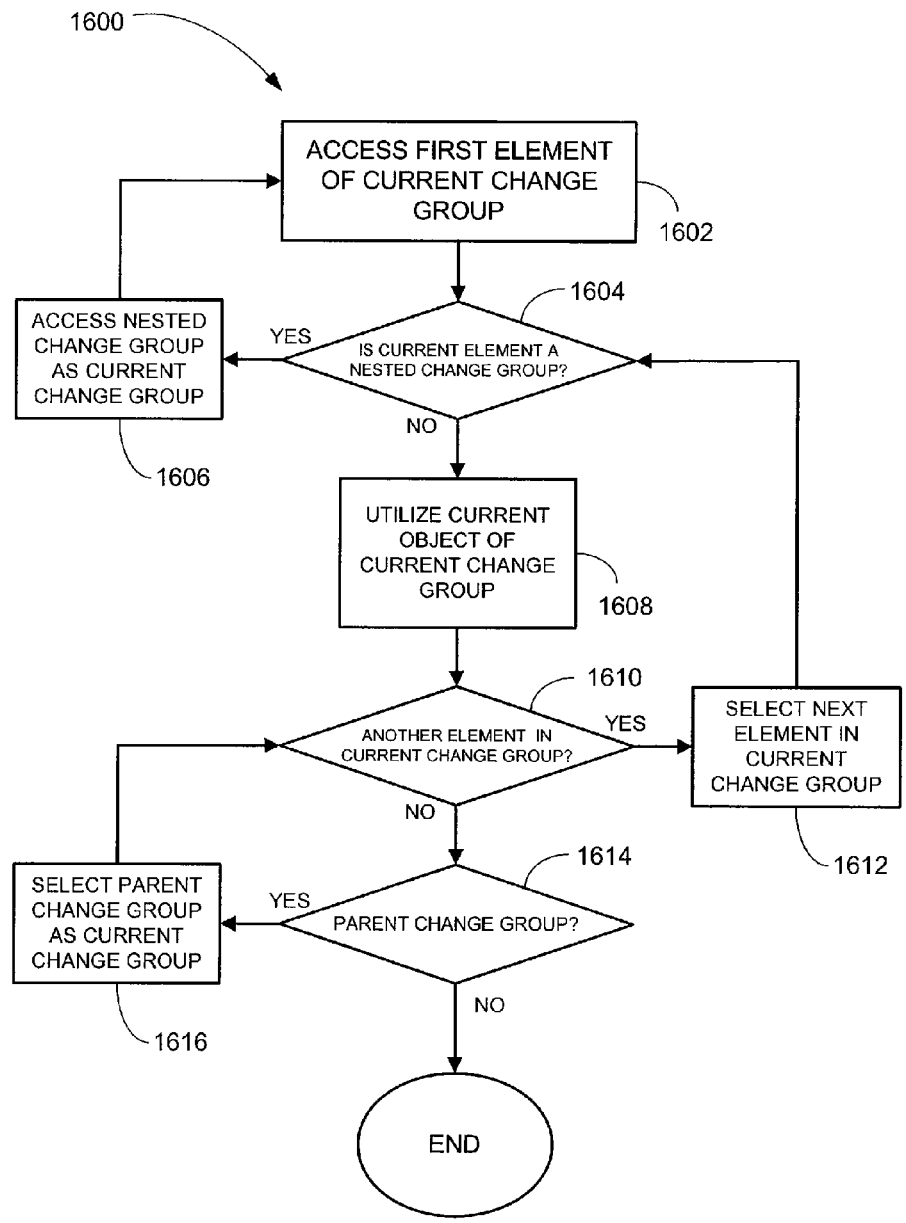
FIG. 16 is a flowchart illustrating a method for selecting server change objects of a server change group used in an example embodiment.

FIG. 16 shows a method 1600 for selecting change objects 902 of a change group 900 (see FIG. 9) according to an example embodiment. In an example embodiment, the method 1600 may be performed at block 1502 and/or block 1514 (see FIG. 15). In an example embodiment, method 1600 may be performed by change manager 602, or any other device or module of the system 600 or a server system (such as the virtual server system 10 of FIG. 1).

A first element of a current change group 900 may be accessed at block 1602. At decision block 1604, a determination may be made as to whether the current element is a nested change group 904 (see FIG. 9). If the current element is a nested change group 904, the nested change group 904 may be accessed as the current server change group 800 and the method 1600 may return to block 1602.

If the current element is not a nested change group 904, the current element may be the change object 902 of the current change group 900 and may be utilized (e.g., as a transitioning change object) at block 1608.

At decision block 1610, a determination may be made as to whether there is another element in the current change group 900. If there is another element (e.g., the nested change group 904 or the change object 902), the next element in change group 900 may be selected at block 1612 and the method 1600 may return to decision block 1604. If there is not another element, the method 1600 may proceed to decision block 1614.

A determination may be made at decision block 1614 as to whether there is a parent change group 900 (e.g., whether the current change group 900 is a nested change group 904). If there is a parent server change group 800, the parent server change group 800 may be selected as the current server change group 800 at block 1616 and the method 1600 may return to decision block 1610. If there is not a remaining parent server change group 800, the method 1600 may terminate.

In an example embodiment, the elements of a change group 900 may be accessed in a sequential, parallel and/or multi-threaded environment. The embodiments are not restricted to these access methods.

Figure 17:
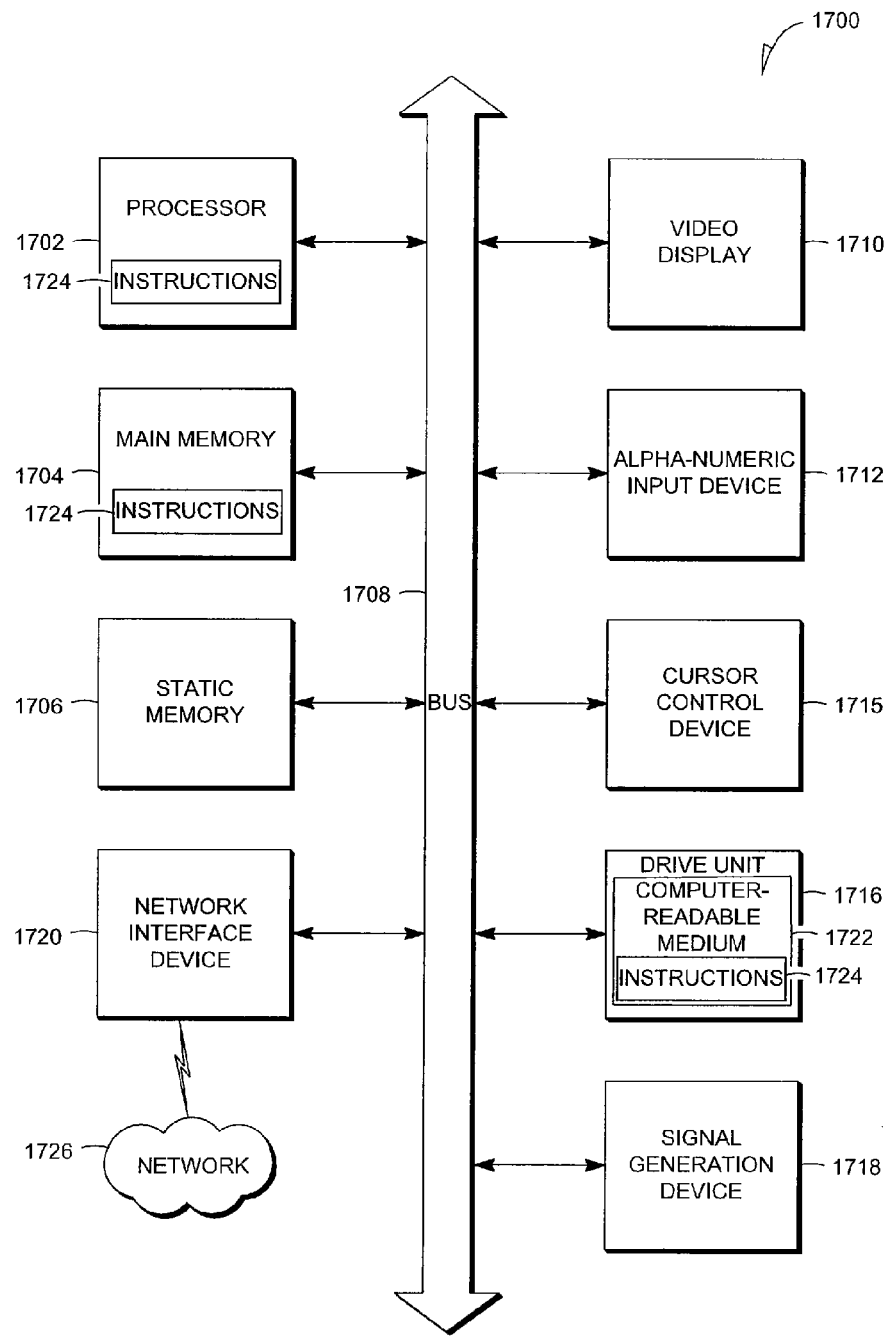
FIG. 17 is a block diagram diagrammatic representation of machine in the example form of a computer system within which a set of instructions, for causing the machine to perform any one or more of the methodologies discussed herein, may be executed.

FIG. 17 shows a diagrammatic representation of machine in the example form of a computer system 1700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical and magnetic media.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a server system including a physical server and a virtual server capable of being deployed on the physical server;
   a server change group comprising a set of server change objects, each server change object represents a server change for m least one of the physical server or the virtual server;
   a change manager operable to receive a request for a change to the server system, and to select only those transitioning change objects from among the larger set of set of server change objects necessary to transition the server system from a current state to an expected state after implementation of the change; and
   a task manager operable to receive the transitioning change objects from the change manager, to cause the execution of the transitioning change objects to implement the change to the server system, and to generate and provide information regarding the execution of the change, wherein the change manager determines whether the change is implemented as a complex job by the task manager, based on a number of the transitioning change objects,
   wherein the change manager is further operable to execute the transitioning change objects to implement the change to the server system, and wherein the change manager determines that the change is implemented by the change manager and not the task manager, when the number of the transitioning change objects corresponding to the change is below a specific threshold.

2. The system of claim 1, where each server change object of the one or more settler change objects comprises at least one of:
   a get state process to obtain a current state of the server change associated with the server change object to the server system,
   an execute process to run the server change associated with the server change object, a reserve process to ready the server system for the execute process, or
   a get/set message process to convey messages during execution of the server change associated with the server change object.

3. The system of claim 1, wherein the task manager is further operable to schedule execution of the transitioning change objects to implement the change associated with the transitioning change objects to the server system as a change task.

4. The system of claim 3, wherein the change task implements a change listener object, the change listener object configured to provide a message regarding execution of the change to an associated transitioning change object.

5. The system of claim 1, wherein the server change group further comprises:
   a completion status criterion to indicate a state of a completed change; and a continue-on-failure state to indicate whether the server change group should continue execution when a requested change associated with a server change object of the server change group has failed.

6. The system of claim 1, wherein the change manager further comprises:
   a release process to unlock a resource of the server system; and an execute process to run the server change associated with the transitioning change object.

7. The system of claim 1, wherein the change manager further determines that the change is to be implemented as a complex job by the task manager, based at least in part on an execution time corresponding to the change.

8. The system of claim 1, wherein when the change is implemented as the complex job by the task manager, the task manager generates and provides the information regarding the execution of the change to the user, the information including: a nature of the change; an execution start time of the change; a running state of the change; an estimated completion time for the change; and one or more operation objects affected by the change.

9. An apparatus comprising:
means for receiving a request for a change to a server system, the server system including a physical server and a virtual server capable of being deployed on the physical server;
means for accessing a plurality of server change objects associated with implementing the change to the server system;
a change manager for selecting from among the plurality of server change objects only one or more transitioning change objects necessary for transitioning the server system from a current state to an expected state after implementation of the change, each of the one or more server change objects including a server change for at least one of the physical server or the virtual server; and
a task manager operable for receiving the transitioning change objects from the change manager, to cause the execution of the transitioning change objects to implement the change to the server system, and to generate and provide information regarding the execution of the change, wherein the change manager determines whether the change is implemented as a complex job by the task manager, based on a number of the transitioning change objects,
wherein the change manager is further operable to execute the transitioning change objects to implement the change to the server system, and wherein the change manager determines that the change is implemented by the change manager and not the task manager, when the number of the transitioning change objects corresponding to the change is below a specific threshold.

10. The apparatus of claim 9, wherein means for executing the transitioning change objects within the server system to implement the change to the server system comprises:
means for executing at least one of the transitioning change objects within the server system;
means for determining whether the at least one of the transitioning change objects was successfully executed; and
means for halting execution of a remaining number of the transitioning change objects when execution of the at least one of the transitioning change objects does not satisfy at least one of a completion status criterion or a continue-on-failure state.

11. A method comprising:
receiving a request for a change to a server system, the server system including a physical server and a virtual server capable of being deployed on the physical server;
accessing a plurality of server change objects associated with implementing the change to the server system;
selecting, by a change manager, from among the plurality of server change objects only one or more transitioning change objects necessary for transitioning the server system from a current state to an expected state after implementation of the change, each of the one or more seltzer change objects including a server change for at least one of the physical server or the virtual server;
determining, by the change manager, whether the change is implemented as a complex job by a task manager, based on a number of the transitioning change objects; and
receiving, by the task manager, the transitioning change objects from the change manager, causing the execution of the transitioning change objects to implement the change to the server system, and generating and providing information regarding the execution of the change,
wherein the change manager is further operable to execute the transitioning change objects to implement the change to the server system, and wherein the change manager determines that the change is implemented by the change manager and not the task manager, when the number of the transitioning change objects corresponding to the change is below a specific threshold.

12. The method of claim 11, wherein executing the transitioning change objects within the server system comprises:
executing at least one of the transitioning change objects within the server system; determining whether the at least one of the transitioning change objects was successfully executed; and
halting execution of a remaining number of the transitioning change objects when execution of the at least one of the transitioning change objects does not satisfy at least one of a completion status criterion or a continue-on-failure state.

13. The method of claim 12, wherein "finish none" is the completion status criterion.

14. The method of claim 11, farther comprising:
reserving the change to the server system, wherein reserving the change to the server system comprises locking one or more resources of the server system.

15. The method of claim 11, further comprising:
preparing the server change objects for execution in parallel.

16. The method of claim 11, further comprising:
extracting a state of the change of the transitioning change objects during execution; and recording the extracted state of the change.

17. Logic encoded in one or more tangible medium for execution and when executed operable to:
receive a request for a change to a server system, the server system including a physical server and a virtual server capable of being deployed on the physical server;
access a plurality of server change objects associated with implementing the change to the server system;
select, using a change manager, from among the plurality of server change objects only one or more transitioning change objects necessary for transitioning the server system from a current state to an expected state after implementation of the change, each of the one or more server change objects including a server change for at least one of the physical server or the virtual server;
determine, using the change manager, whether the change is implemented as a complex job by a task manager, based on a number of the transitioning change objects; and
receive, using tile task manager, the transitioning change objects from the change manager, cause the execution of the transitioning change objects to implement the change to the server system, and generate and provide information regarding tile execution of the change,
wherein the change manager is further operable to execute the transitioning change objects to implement the change to the server system, and wherein the change manager determines that the change is implemented by the change manager and not the task manager, when the number of the transitioning change objects corresponding to the change is below a specific threshold.

18. The logic encoded in one or more tangible medium of claim 17, further comprising logic operable to:
   extract a state of tile change of the transitioning change objects during execution; and record the extracted state of the change.

\* \* \* \* \*